Figure 1:
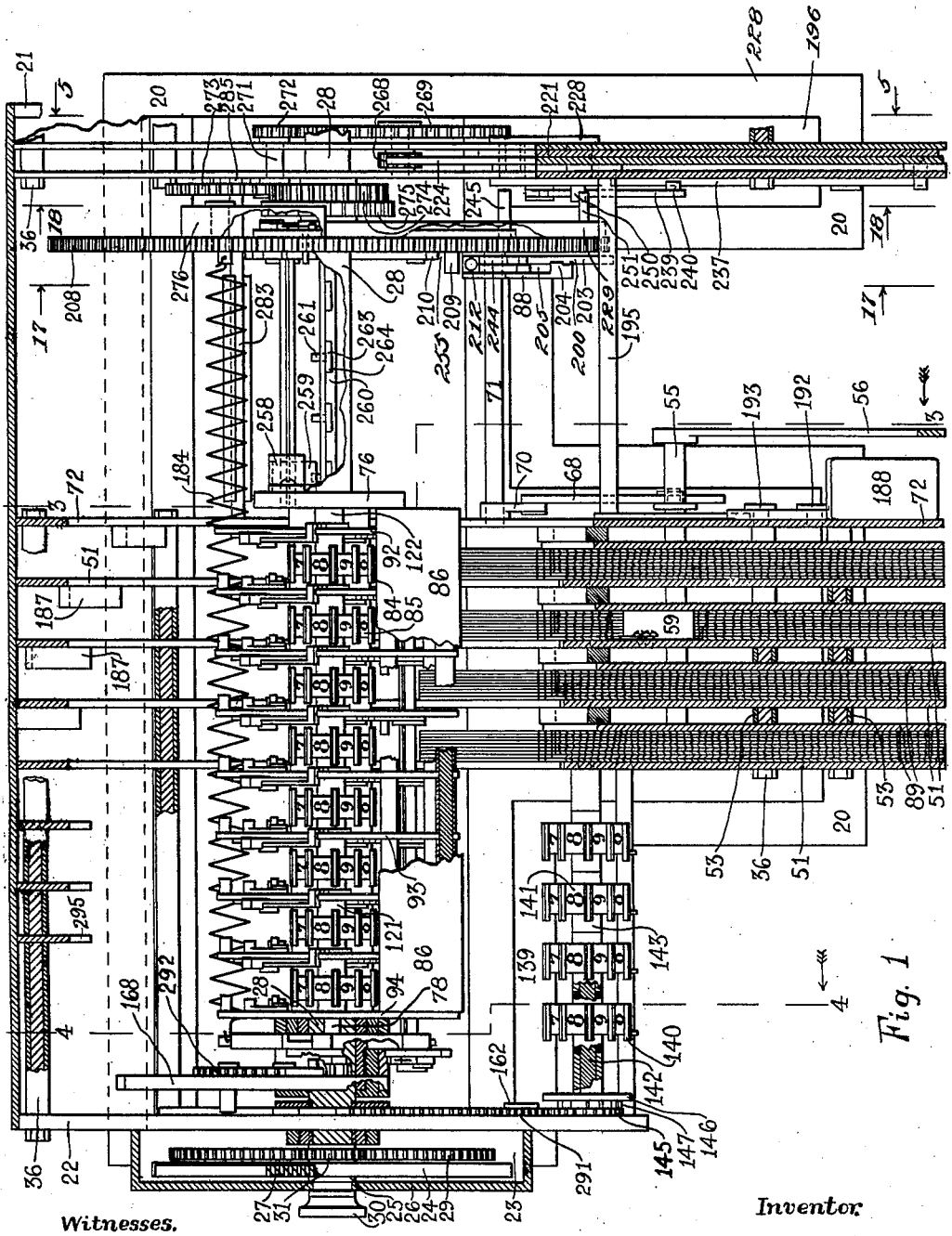

No. 879,448. PATENTED FEB. 18, 1908.
B. E. ELDRED.
CEMENT BURNING APPARATUS.
APPLICATION FILED DEC. 1, 1906.
4 SHEETS—SHEET 1.
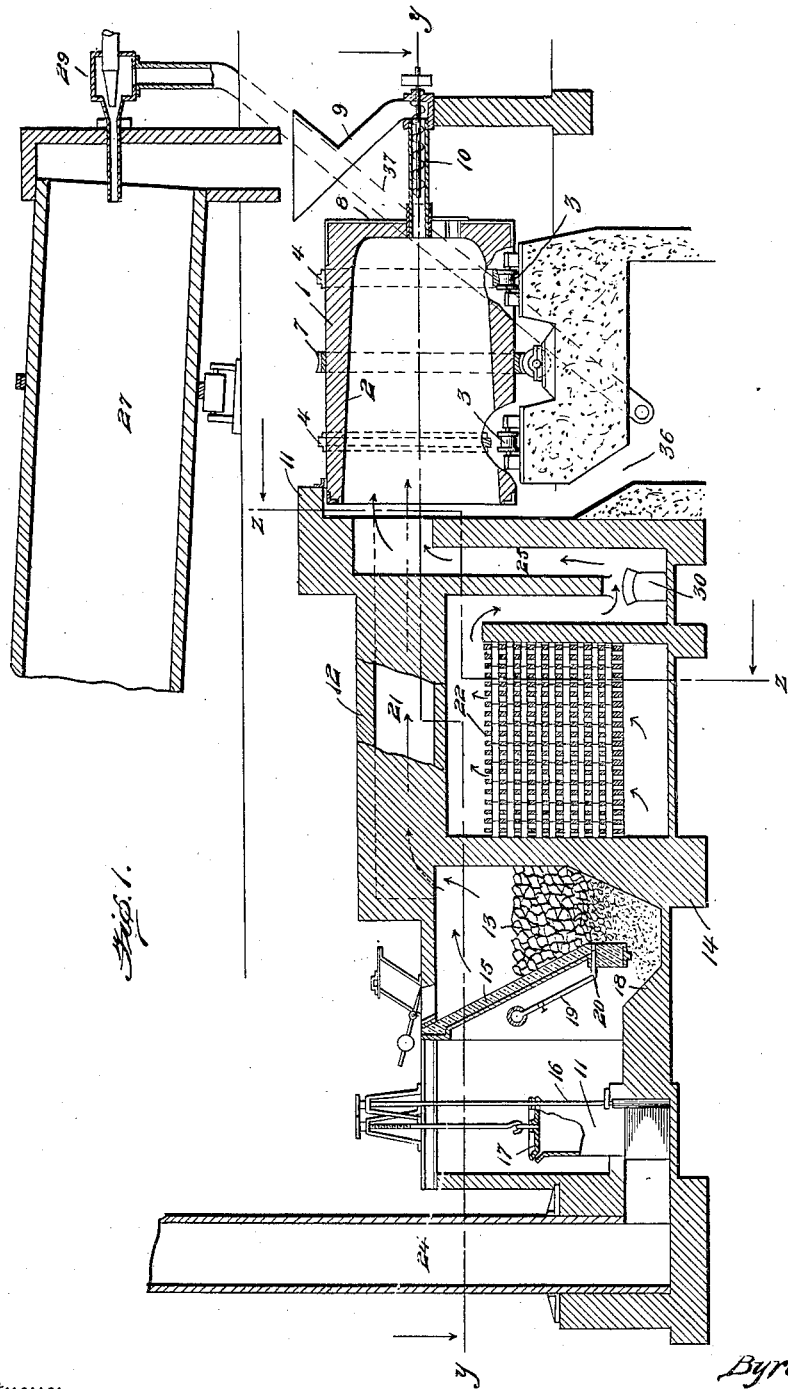

No. 879,448. PATENTED FEB. 18, 1908.
B. E. ELDRED.
CEMENT BURNING APPARATUS.
APPLICATION FILED DEC. 1, 1906.
4 SHEETS—SHEET 2.
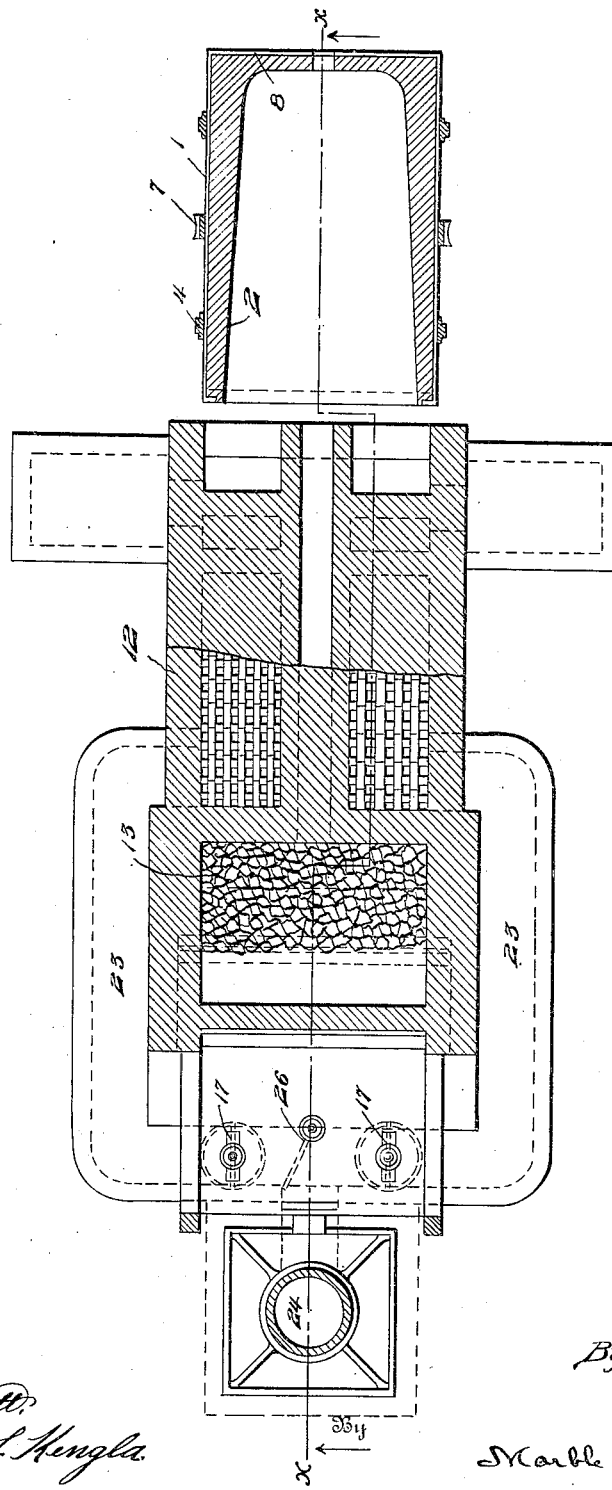
Witnesses
B. M. Offutt
Edward L. Hengla
Inventor
Byron E. Eldred
Marble & McElroy
Attorneys

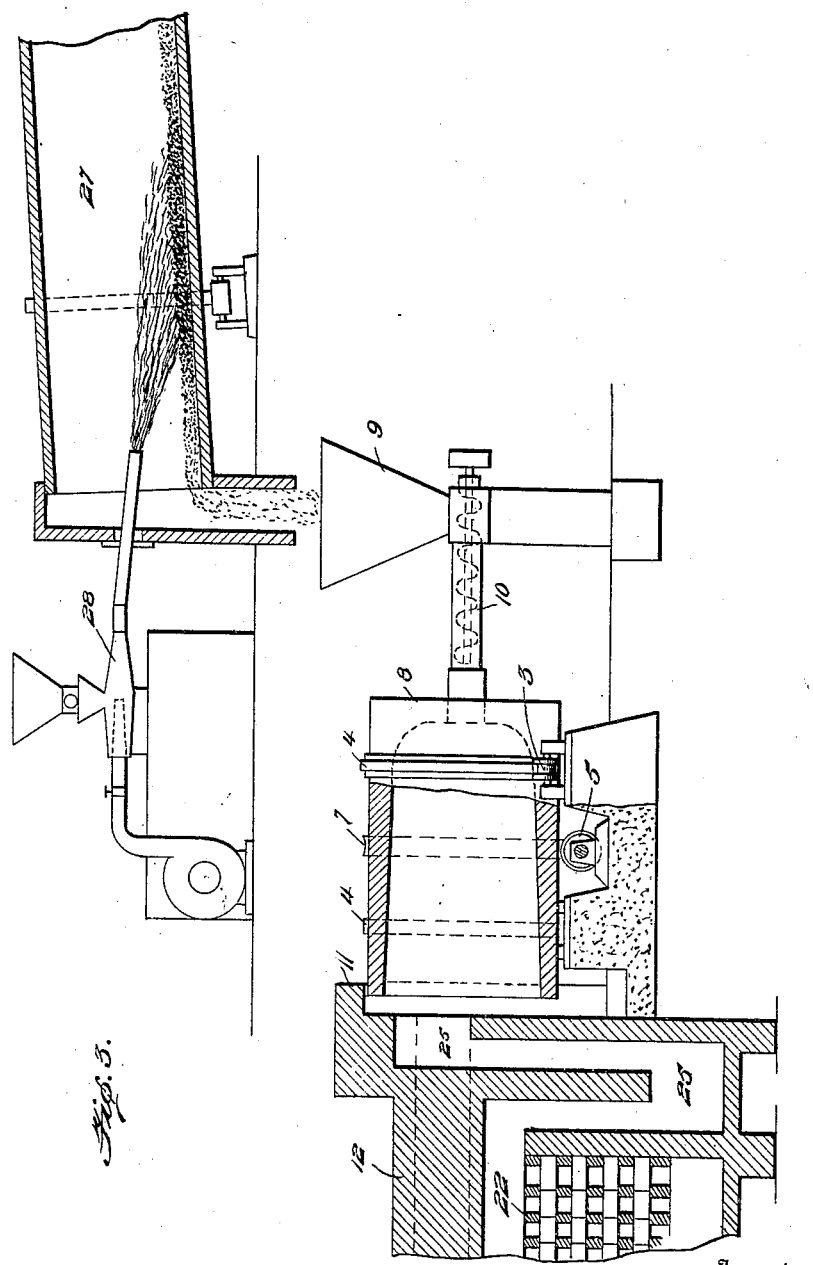

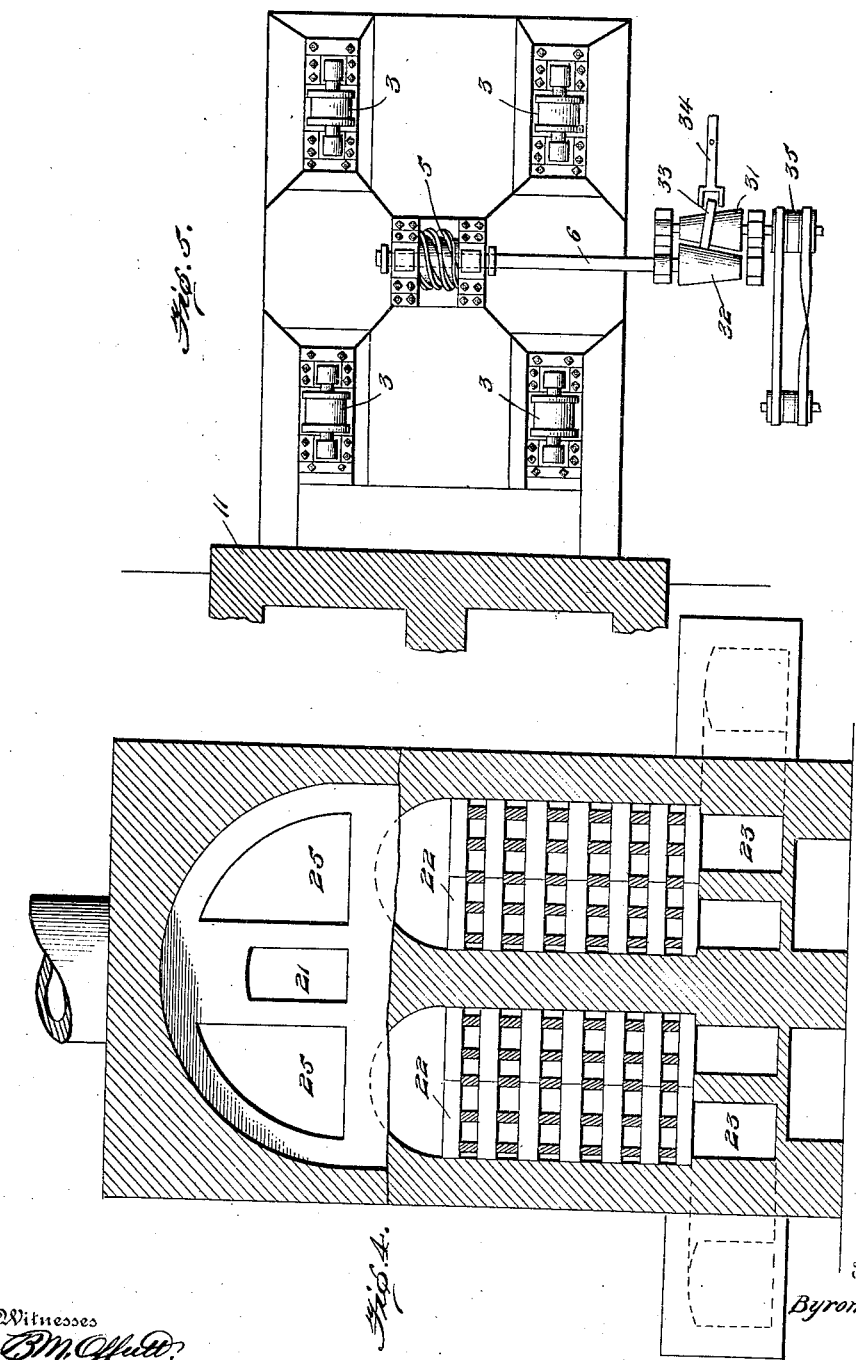

UNITED STATES PATENT OFFICE.

BYRON E. ELDRED, OF BRONXVILLE, NEW YORK.

CEMENT-BURNING APPARATUS.

No. 879,448.   Specification of Letters Patent.   Patented Feb. 18, 1908.

Application filed December 1, 1906. Serial No. 345,958.

*To all whom it may concern:*

Be it known that I, BYRON E. ELDRED, a citizen of the United States, residing at Bronxville, in the county of Westchester and State of New York, have invented certain new and useful Improvements in Cement-Burning Apparatus; and I do hereby declare the following to be a full, clear, and exact description of the same, such as will enable others skilled in the art to which it appertains to make and use the same.

This invention relates to cement burning apparatus, and consists in an organization of heating and other apparatus adapted to convert cement materials into cement clinker and to perform other high temperature heating operations; all as more fully hereinafter set forth and claimed.

In the current modern practice of producing cement clinker, the raw materials, generally clay and some form of calcium carbonate, either naturally or artificially mixed, are reduced to a dry powder and passed down through a rotary inclined kiln in heating relation to a flame and flame gases traveling up through the kiln. Many other materials requiring application of high temperatures are treated in the same type of kilns in much the same way; as for example, in sintering or nodulizing iron ores. In treating cement materials in such kilns, during their slow downward passage through the kiln they undergo a variety of changes, of which the most important are, the calcination of the calcium carbonate to form lime—a change which occurs in the upper part of the kiln—and the union of this lime with the clay and silicates to form clinker—an action which takes place in the lower portion of the kiln. For the sake of brevity, these two reactions may be, and are commonly, called calcining and clinkering respectively. Calcining is an operation which requires a large amount of heat but needs only a relatively low temperature, being dependent indeed as much on the composition of the gases in contact with the calcining material as upon the sheer degree of heat. Clinkering on the other hand absorbs little or no heat, possibly evolving some by the exothermic action of silica and alumina upon lime, but needs a relatively high temperature to institute the reaction; a temperature but little below that which will melt down clinker or ruin the refractory linings of the kiln. Obviously a very nice balance of temperature is required in clinkering; a balance not at all required in calcining. Despite their diverse thermal requirements, both these operations have been customarily performed in a single kiln working with a single source of heat; this source of heat being usually a flame plume of powdered coal, carried in aerial suspension by an air jet, and burning in the mouth of the kiln. Powdered coal is one of the few cheap and available fuels which will afford the necessary high temperature conditions for clinkering. In producing this temperature in the manner described, there is, however, a great loss of fuel, three or four times as much being necessary as should be theoretically required. Part of this loss is due to the great amount of air which must be supplied, both to insure the free combustion necessary to develop the clinker forming temperature and to supply the natural draft of the hot kiln and stack. There is usually a violent inrush of air on all sides of the flame plume, forming a sort of "sheath" of relatively cool air. This great amount of air, together with the excessive amount of coal which must be burned, causes a very violent rush of gases through the kiln, picking up much of the cement material as dust. This dusting renders impracticable the use of the ordinary heat regenerating or recuperating means in the usual operation of cement kilns.

In a previous patent, No. 829,956, dated Sept. 4, 1906, I have described and claimed a process of operating by which many of these disadvantages are obviated and a number of new advantages gained; such process consisting in splitting up the usual operation into a number of discrete stages and performing each stage of heating in a separate apparatus by a separate source of heat, each such source of heat being particularly adapted to meet the thermal requirements of its particular stage. In another patent, No. 829,957, dated Sept. 4, 1906, I have described and claimed sundry types of apparatus adapted to perform the stated process and others of like nature. The apparatus herein illustrated and described is intended to carry out the process of said Patent No. 829,956, and constitutes a modification of and improvement upon the apparatus of said Patent No. 829,957, being particularly designed to be used in altering existing cement burning apparatus to operate in accordance with the inventions of my said patents. By means of the apparatus herein described, when used in combination with the ordinary kilns of such existing apparatus, all or substantially all of the sintering may be done in the special sintering kiln herein illustrated and described, the ordinary kiln to which said sintering kiln is applied then becoming merely a calcining kiln, delivering its calcines into the sintering kiln; but by so adding my special sintering kiln to the existing kiln, and employing the latter simply as a calcining kiln, it becomes possible to greatly increase the rate of feed of the material through such latter kiln, thus greatly increasing the capacity of the plant as a whole, with a proportionate diminution of the amount of coal burned per unit of raw material; and other important advantages are likewise realized.

The apparatus herein described may also be used in other operations involving progressive heating materials to high but definite temperatures, as for example the nodulizing of iron ores.

In the sintering or clinkering kiln herein described, instead of producing the necessary high temperature for sintering by a coal flame, as has been the common practice when both operations have been carried out in the same kiln, I produce it with a producer gas flame used in a certain manner, causing the temperature conditions in the clinkerer to remain at the exact high temperature required with a minimum consumption of fuel and with the use of such fuel in a very cheap form. The coal dust ordinarily employed requires expensive grinding and grading of special coals, while in the producer any form of cheap coal may be employed.

As there is substantially no absorption of heat in the clinkering operation and there may even be evolution of heat to some extent, the amount of combustible required to heat a separate clinkerer is only that which will suffice to raise the temperature of the calcines to the clinkering point—a small amount; and that which will compensate for radiation losses plus heat carried away in the clinker and discharged gases. The total of the heat losses by radiation and by heat carried away by the clinker is small; and by regeneration or recuperation of the entering air, as herein described, the loss by heat carried away in the issuing gases is also made small; so that the amount of combustible required in the clinkerer is correspondingly small. So to speak, the heat in the clinkerer is almost static. This small amount of high temperature heat, I have discovered, can be easily, cheaply and readily produced by the use of a small gas producer delivering hot gas directly from the producer into the clinkerer, and by the use of a regenerator or recuperator which heats to a high temperature the air required for the combustion of such gas. A regenerator is here practicable both because the clinkerer works only on calcined material already heated almost or quite to its sintering temperature, and hence not inclined to "dust", and because of the special way the clinkerer operates, whereby the carrying of dust into the regenerator is substantially avoided. In the described arrangement of apparatus, the ordinary kiln being converted into a simple calciner high efficiency may be attained with the coal burned and the amount of coal per unit of raw material being reduced, with a given speed of travel of such material through the kiln the rush of hot gases is much diminished with a concomitant diminution in the troubles arising from dusting. And as the consumption of coal in feeding the producer of the clinkering kiln is very little, the total amount of coal required for a barrel of cement is much reduced.

The clinkerer which I employ, as above described, consists of a relatively short rotary inclined kiln, lined with refractory material and provided with a hood substantially sealing the same at the upper end, the lower end of said kiln being open but fitting within the hood of a regenerator hereinafter described. The "inclination" of the kiln may be due to its having an axis of rotation inclined with respect to the true horizontal, or to a taper of the interior wall of the kiln. The calcines, coming from another source, as above described, enter the upper or closed end of said clinkerer, and after being sintered in such kiln are discharged as finished clinker at the lower end of such kiln. A gas conduit leading as directly as practicable from a gas producer and arranged to permit as little as possible loss of heat from the hot gas delivered by the producer, discharges such gas more or less axially into the clinkerer. On either side of this conduit are ducts communicating with a special regenerative apparatus, comprising twin regenerators arranged to be heated alternately by the hot gases issuing from the kiln and to impart heat alternately to the entering air; the arrangement being such that the entering gas and air currents enter the clinkerer side by side, mingle therein and burn, the flame gases and products of combustion recurving and passing out at the same end of the kiln at which the producer gas and air entered, but through a different duct; the two regenerators being operated in alternation, of course, one being heated by the passage through it of the hot issuing gases, while the other is imparting heat to the entering air, the regenerators being reversed or exchanged, as to function, from time to time. But the regenerating apparatus is so constructed that there are no reversing valves exposed to high temperature gases, and that the direction of flow of the air current inward through the regenerator is the exact opposite of the direction of flow of the products of combustion outward through the regenerator, so that there is a maximum interchange of heat and the products of combustion issue relatively cold; one and the same end of each regenerator being always relatively cold and the other end relatively hot.

The accompanying drawings illustrate one embodiment of my invention.

In said drawings: Figure 1 shows diagrammatically and in vertical section a gas producer, regenerator apparatus and clinkering kiln arranged and constructed according to my invention, and also shows an ordinary cement kiln arranged to deliver calcines to said clinkering kiln; the section being taken on the irregular section line $x$—$x$ of Fig. 2. Fig. 2 shows diagrammatically and in horizontal section, the said producer, regenerator apparatus and clinkering kiln, the section being taken on the irregular section line $y$—$y$ of Fig. 1. Fig. 3 is a detail section similar to Fig. 1, but illustrative of alternative means of heating the calcining kiln. Fig. 4 shows a transverse vertical section through the regenerator apparatus, taken on the irregular section line $z$—$z$ of Fig. 1. Fig. 5 is a detail top of driving and speed-changing and reversing mechanism for the clinkering kiln.

In said drawings, 1 designates the said clinkering kiln. It is a short barrel kiln, the axis of which, in Fig. 1, is substantially horizontal, though in Fig. 3 said axis is shown slightly inclined. The interior surface 2 of the lining of the kiln is shown, in both cases, as a tapering or approximately conical surface, so that, in so far as the feeding of material through the kiln, both kilns are in effect inclined; the effective inclination of the kiln of Fig. 3 being the sum of both inclinations mentioned. It is obviously possible to make either inclination sufficiently great to make the other unnecessary, as illustrated, for example, in Fig. 1. The kiln having a truly horizontal axis is of course the better form in so far as mounting for rotation and driving is concerned; though the difference is not great. I have shown both forms of kiln mounted in the customary manner, on grooved rollers 3 engaging bearing rings 4 on the kiln, the latter being arranged to be rotated by a worm 5 on a shaft 6 driven as hereinafter described, and driving a worm 7 on the kiln.

The kiln shown in Fig. 1 has at its upper end a housing 8 substantially closing such end of the kiln, while in Fig. 3 the equivalent and alternative construction of a kiln end integral with the barrel of the kiln is shown. Suitable means for feeding calcines into the kiln are provided, as for example a hopper 9 and screw-conveyer 10 entering the kiln axially. At its lower end the kiln is open, but fits within a hood or housing 11 of the regenerating apparatus 12.

The gas producer, 13 is placed as near as practicable to the regenerating apparatus, being in fact inclosed within the same side walls, the third side of said producer being the wall 14 separating it from the regenerators, and the fourth side an inclined wall 15 suitably supported. In the space behind said wall are air admission tubes 16 adapted to be closed at the top by valves 17; said tubes connected at the bottom to the regenerator passages 23 hereinafter mentioned. 18 designates the usual ash-pit, 19 the usual blast pipe, and 20 the usual twyers. The gas exit duct, or conduit, 21, for conveying the gas from the producer to the kiln, passes over the top of the regenerating apparatus, being in fact built into the regenerator structure, its walls being of non-conducting material.

There are twin regenerator chambers, 22, containing the usual filling of brick checkerwork or the like, each such chamber having at its lower end a passage 23 connecting with the stack 24, and having at its upper end a down-dipping and recurving passage or duct 25 leading to the interior of kiln 1, the orifices of said ducts 25 being on either side of the gas supply passage 21. A butterfly valve 26 is provided for controlling the connection of the regenerator passages 23 to the stack.

27 designates an ordinary cement kiln, such as are now commonly used both to calcine and to sinter the material; it being my intention that my improved clinkering kiln shall be added to such ordinary cement kiln, the latter then being used simply as a calcining kiln, the temperature, flame conditions, rate of feed, and rate of supply of material being regulated so that the work done in kiln 27 is mainly or entirely calcining the calcined material being delivered from kiln 27 into hopper 9. In so adding my clinkering kiln to an existing cement kiln I make such changes in the material-feeding devices of the latter, and the driving mechanism thereof, as enable a much greater amount of material to be fed into the kiln and to enable it to be driven at much greater speed; for I find that when only calcining is to be done in kiln 27, for the same amount of fuel burned it is capable of treating a much greater amount of material and of effecting calcination thoroughly while the material is fed through it at much higher speed than is advisable when both calcining and sintering are performed in kiln 27. Most present cement kilns are provided with pulverized coal burners, and such burners may be retained, as indicated in Fig. 3, in which such a burner, 28, is indicated in connection with kiln 27 there shown; it being possible to use the ordinary burner without alteration.

But preferably I provide the calcining kiln with a burner using producer gas, such as the gas burner 29, Fig. 1, for example; doing so because producer gas is a much cheaper, safer, and more convenient fuel, and its flame may be regulated with greater nicety and through a greater range.

The operation of the apparatus is as follows:—Calcining kiln 27 being in operation and delivering calcines into hopper 9, said calcines are delivered by conveyer 10 into kiln 1. Hot producer gas is passing directly from producer 13 through duct 21 into the interior of kiln 1, and air is passing through the lower air passage 23 of one of the twin regenerators up through the checker-work of such regenerator and through the passage 25 of that regenerator into kiln 1, there encountering the producer gas from duct 21 and burning the same. The flame plume is projected well toward the upper end of the kiln and then the flame gases recurve and pass out through the other passage 25, down through the other regenerator 22, and thence through the other lower passage 23 and out through the stack. From time to time the butterfly valve 26 and air valves 17 are operated to change the functions of the two regenerators, that regenerator which has been heating the entering air current now receiving the issuing gases and being heated thereby, while that regenerator which has previously been heating up, now giving off its heat to the entering air. To so reverse the action of the regenerators, the butterfly valve 26 is reversed and the valve 17 of the passage 23 which is so connected to the stack is closed, and the valve 17 of the other passage 23 opened. It will be seen that the entering air first encounters that portion of the regenerator from which during the heating up operation, the products of combustion issue, and which therefore has the lowest temperature, and that the entering air issues from that end of the regenerator which, during the heating up operation, receives the products of combustion and consequently has the highest temperature. This insures maximum exchange of heat and at the same time permits an arrangement of passages and valve whereby said valve is not exposed to hot gases. Furthermore, the direction of flow of the entering air through the regenerator being opposite that of flow of the issuing gases through the regenerator, there is a strong tendency for any dust carried out from the kiln by the issuing gases, to be carried back into the kiln by the entering air current when the operation of the regenerators is next reversed; the action of the air currents therefore, tending to keep the regenerators clean and free from dust; a very important point. Collection of dust in the regenerators is further guarded against by the down-dipping passage 25, through which the products of combustion pass before entering the regenerator, there being a strong tendency to throw out any dust in the products of combustion, at the bottom of this passage. Cleaning doors 30 are commonly provided at the bottom of passage 25. Preferably, though not necessarily, the direction of rotation of kiln 1 is changed when the action of the regenerators is reversed, so that the gases entering the kiln, which of course have the higher temperature, may pass in close proximity to the upturning side of the kiln, against which, of course, the bulk of the sintering material tends to lie; the issuing gases then passing out along the downturning side of the kiln. When this is the case, the tendency of the air currents is as a whole, to carry any dust back into the kiln. To permit driving the kiln at any desired speed and in either direction, I have shown in Fig. 5, familiar speed changing and reversing mechanism arranged to drive shaft 6, comprising reversely arranged friction cones 31 and 32, and an intervening band 33 with means 34 for shifting the same longitudinally, and the familiar straight and crossed belt reversing device 35. But any suitable reversing and speed changing device may be employed.

The producer gas is not passed through the regenerator, because as said gas issues from its producer it is already quite as hot as necessary, and if conducted as directly as possible to the kiln through heat insulating passages, it suffers practically no cooling. The entering air current is heated up by the regenerator and thus acquires a high temperature adapting it to produce in the kiln a high temperature with cheap producer gas of low thermal value.

The sintering operation being rapid, the clinkering kiln 1 may be quite short, as shown and yet have a high capacity; except for its short length it would hardly be practicable to produce the inclination of its walls necessary for feeding the material, by merely tapering said walls; but its short length makes this possible. Substantially the entire length of ordinary kiln, 27, being now available for calcining only, said kiln is now able to effectively calcine a far greater amount of material than before, and at the same time there is not the same necessity for careful and skilful regulation of flame conditions.

The proportions of the clinkering kiln are preferably about as shown; i. e., with a length not much greater than its diameter. Its internal length should not be much more than twice its diameter internally since a long narrow kiln would not permit the normal development of the recurving flame throughout and clinkering temperatures would not be attained beyond the flame zone, making the upper part of such a long narrow kiln substantially useless for the present purposes. And the upper end should be formed by a sealing wall, substantially sealed against exit of gases, coöperating in shape with the kiln walls to permit such normal development of the recurving flame, this wall being either integral with the kiln walls, as in Fig. 1, and revolving therewith, or closely fitting against such kiln walls, as shown in Fig. 3. Preferably it is given a basin-like curve as sharp corners at the meeting of the kiln walls and end wall would interfere with the normal development of the flame.

One important advantage of the tapering clinkering kiln as shown, for example, in Fig. 1, is that, as the material treated descends through the kiln, the rate of feed of the material grows progressively more rapid, owing to the progressive increase of internal diameter of the kiln. This action produces a peculiar spreading out of the material which is very advantageous.

When heating up kiln 27, preparatory to operating it, it may be heated up to the necessary high temperature for burning the coal dust jet, either by a wood fire built in its lower end, as commonly employed, or by a producer gas burner like that shown on the kiln 27 of Fig. 1, but portable, said burner being removed, and the coal dust burner substituted, if the kiln is well heated. But, as above stated, for economical reasons it appears desirable to heat both kilns by a producer gas flame.

By operating the regenerators in the manner described, a very efficient exchange of heat from the outgoing products of combustion to the entering air is effected and the gases are so cooled by the time they reach the butterfly valve as not to injure the latter. The clinker discharged from the kiln contains much heat and this heat may be used to advantage for heating up the air supplied to the calcining kiln. Therefore I show in Fig. 1 the clinker discharged into a clinker pit 36. Air to support combustion in the calcining kiln is drawn from this pit and is led by passage 37 to the calcining kiln.

What I claim is:—

1. A clinker making apparatus comprising in combination a rotary cement kiln provided with coal firing means adapted to produce relatively low calcining temperatures therein and a regeneratively operating clinkering kiln receiving calcines therefrom.

2. A clinker making apparatus comprising in combination a rotary cement kiln provided with firing means adapted to produce relatively low calcining temperatures therein, and a rotary clinkering kiln provided with means for withdrawing products of combustion at its clinker discharge end and with gas firing means also at the clinker discharge end.

3. In a clinker making apparatus, a rotary inclined clinkering kiln provided with a sealing wall closing its upper end, means for introducing calcines therethrough, means for withdrawing clinker at its lower end, and gas firing means and means for withdrawing products of combustion, both located at said lower end.

4. Clinker making apparatus, comprising in combination a rotary inclined calcining kiln and a rotary clinkering kiln receiving calcines therefrom, said clinkering kiln being provided with gas firing means adapted to produce a gas flame entering and leaving said kiln at the clinker discharge end.

5. In clinker making apparatus, a rotary inclined clinkering kiln provided with a sealing wall at its upper end substantially closed against exit of gases and having means for introducing calcines therethrough and having means for introducing a gas flame and withdrawing products of combustion from the lower end.

6. Clinker making apparatus comprising in combination a rotary inclined clinkering kiln provided with a sealing wall at its upper end substantially closed against exit of gases and having means for introducing calcines therethrough and also provided with an open lower end, a twin regenerator abutting against said lower end and gas firing means also abutting against said lower end.

7. Clinker making aparatus, comprising in combination a rotary inclined clinkering kiln provided with a sealing wall at its upper end substantially closed against exit of gases and having means for introducing calcines therethrough and also provided with an open lower end, a gas producer having a gas conduit terminating within said open end, and a twin regenerator abutting against said open end.

8. Clinker making apparatus, comprising in combination a rotary inclined clinkering kiln having an open lower end, a sealing wall at its upper end, substantially closed against exit of gases and having a curving cavity registering with the internal kiln walls, a gas producer a heat insulated conduit delivering hot gas from the producer within said lower end, a twin regenerator abutting against the lower end, and twin conduits from the regenerators opening into the kiln on either side of said gas conduit.

9. Clinker making apparatus, comprising in combination a rotary inclined kiln, means for rotating the same, means for changing the direction of rotation, axial means for directing and burning a current of hot gas into the lower end of the kiln, and means for withdrawing products of combustion alternately from right and left of said axial gas burning means.

10. In clinker making apparatus, a rotary inclined kiln having a sealing wall at its upper end provided with a curved cavity registering with the internal walls of the kiln means for delivering solid material therethrough No. 879,449. PATENTED FEB. 18, 1908.
E. S. ENSIGN.
CALCULATING MACHINE.
APPLICATION FILED MAY 3, 1906.

12 SHEETS—SHEET 1.

Witnesses.
Melva W. Porter
Francis E. Smith

Inventor
Emory S. Ensign.
By Charles F. A. Smith
Attorney.